United States Patent
Fritze (12)

(10) Patent No.: US 6,177,526 B1
(45) Date of Patent: *Jan. 23, 2001

(54) SUPPORTED CATALYST SYSTEM, PROCESS FOR ITS PREPARATION AND ITS USE FOR THE POLYMERIZATION OF OLEFINS

(75) Inventor: Cornelia Fritze, Frankfurt (DE)

(73) Assignee: Targor GmbH (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/869,801

(22) Filed: Jun. 5, 1997

(30) Foreign Application Priority Data

Jun. 5, 1996 (DE) ............................... 196 22 481

(51) Int. Cl.⁷ .................................. C08F 4/02; C08F 4/42
(52) U.S. Cl. .......................... 526/128; 526/129; 526/160; 526/348; 526/943; 502/104; 502/120; 502/121; 502/122; 502/123
(58) Field of Search .................................. 526/128, 129, 526/160, 943, 348; 502/120, 121, 122, 123, 104

(56) References Cited

U.S. PATENT DOCUMENTS

| | | | |
|---|---|---|---|
| 4,478,988 | * 10/1984 | Pullukat et al. | 526/128 |
| 4,524,141 | * 6/1985 | Pullukat et al. | 526/128 |
| 4,578,440 | * 3/1986 | Pullukat et al. | 526/128 |
| 4,808,561 | * 2/1989 | Welborn | 526/129 |
| 5,006,619 | * 4/1991 | Pullukat et al. | 526/128 |
| 5,124,418 | * 6/1992 | Welborn, Jr. | 526/114 |
| 5,206,199 | * 4/1993 | Kioka et al. | 526/128 |
| 5,627,246 | * 5/1997 | Langhauser et al. | 526/128 |
| 5,639,835 | * 6/1997 | Jejelowo | 526/129 |
| 5,807,938 | * 9/1998 | Kaneko et al. | 526/160 |

FOREIGN PATENT DOCUMENTS

| | | |
|---|---|---|
| 0 206 794 | 12/1986 | (EP) . |
| 0 676 418 | 10/1995 | (EP) . |
| 0 727 443 | 8/1996 | (EP) . |
| 0 757 992 | 2/1997 | (EP) . |

* cited by examiner

*Primary Examiner*—David W. Wu
*Assistant Examiner*—R. Rabago
(74) *Attorney, Agent, or Firm*—Connolly, Bove, Lodge & Hutz, LLP

(57) ABSTRACT

The present invention relates to a supported catalyst system which comprises at least one metallocene component and at least one cocatalyst component and at least one modified inorganic oxide of silicon, aluminum or mixtures thereof, wherein the modified oxide contains organic silicon radicals containing at least one of the groups nitrogen, fluorine, phosphorus or sulfur.

17 Claims, No Drawings

SUPPORTED CATALYST SYSTEM, PROCESS FOR ITS PREPARATION AND ITS USE FOR THE POLYMERIZATION OF OLEFINS

The present invention relates to a highly active supported catalyst system which can advantageously be used in olefin polymerization and a process for its preparation as well as polymers which are prepared using the supported catalyst system.

Processes are known for preparing polyolefins with the aid of soluble, homogeneous catalyst systems comprising a transition metal component of the metallocene type and a cocatalyst component of the aluminoxane type, a Lewis acid or an ionic compound. These catalysts have a high activity and give polymers and copolymers having a narrow molecular weight distribution.

In polymerization processes using soluble, homogeneous catalyst systems, thick deposits form on reactor walls and stirrer if the polymer is obtained as a solid. These deposits are formed by agglomeration of the polymer particles whenever metallocene and/or cocatalysts are present in dissolved form in the suspension. Such deposits in the reactor systems have to be removed regularly, since they quickly reach considerable thicknesses, have a high strength and prevent heat exchange to the cooling medium. Furthermore, homogeneous catalyst systems cannot be used for the preparation of polyolefins in the gas phase. To avoid deposit formation in the reactor, supported catalyst systems in which the metallocene and/or the aluminum compounds serving as cocatalyst are fixed on an inorganic support material have been proposed.

EP-A-576970 discloses a catalyst system comprising a metallocene of the formula

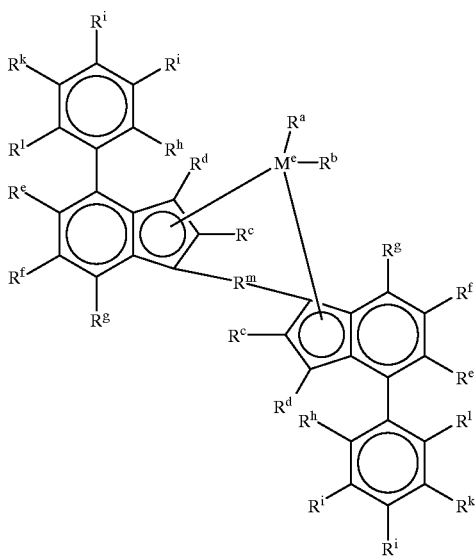

where
$M^a$ is a metal of group IVb, Vb or VIb of the Periodic Table, $R^a$ and $R^b$ are identical or different and are each a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, an OH group or a halogen atom, the radicals $R^c$ are identical or different and are each a hydrogen atom, a halogen atom, a $C_1$–$C_{10}$-alkyl group which may be halogenated, a $C_6$–$C_{10}$-aryl group, an —$NR^p_2$, —$SR^p$, —$OSiR^p_3$—, —$SiR^p_3$— or —$PR^p_2$ radical, where $R^p$ is a halogen atom, a $C_1$–$C_{10}$-alkyl group or a $C_6$–$C_{10}$-aryl group, $R^d$ to $R^l$ are identical or different and are as defined for $R^c$, or adjacent radicals $R^d$ to $R^l$ together with the atoms connecting them form one or more aromatic or aliphatic rings, or the radicals $R^e$ and $R^h$ or $R^l$ together with the atoms connecting them form an aromatic or aliphatic ring, $R^m$ is

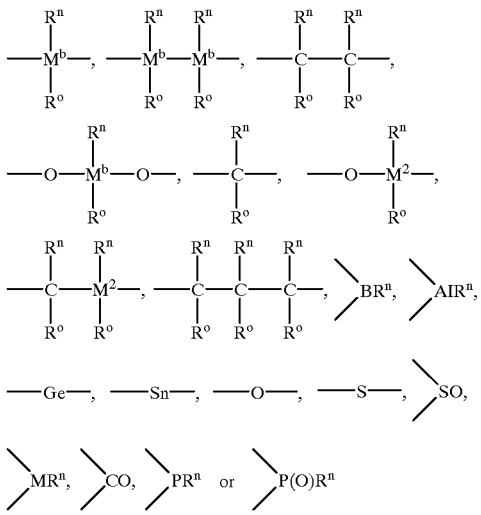

where $R^n$ and $R^o$ are identical or different and are each a hydrogen atom, a halogen atom, a $C_1$–$C_{10}$-alkyl group, a $C_1$–$C_{10}$-fluoroalkyl group, a $C_1$–$C_{10}$-alkoxy group, a $C_6$–$C_{10}$aryl-group, a $C_6$–$C_{10}$-fluoroaryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, or $R^n$ and $R^o$ in each case together with the atoms connecting them form one or more rings and $M^b$ is silicon, germanium or tin, and a supported cocatalyst. This supported catalyst system gives isotactic polypropylene at an activity of from 50 to 540 kg of PP/g of metallocene xh at an Al:Zr ratio of >400:1.

EP-A-287666 describes a process for the polymerization of olefins in the presence of a catalyst comprising a transition metal compound, an aluminoxane, an organoaluminum compound having a hydrocarbon group different from n-alkyl groups and an inorganic support which may be modified by an organometallic compound or a halogen-containing silicon compound as solid catalyst component, where the transition metal compound is represented by the formula $$R^q_k R^r_l R^s_m R^t_n Me,$$

where $R^q$ is a cycloalkadienyl group, $R^r$, $R^s$ and $R^t$ are identical or different and are each a cycloalkadienyl group, an aryl group, an alkyl group, an arylalkyl group, a halogen atom or a hydrogen atom, Me is zirconium, titanium or hafnium, k is 1, 2, 3 or 4, l, m and n are 0, 1, 2 or 3 and k+l+m+n=4. The halogen-containing silicon compounds used for modifying the inorganic support are represented by the formula $$SiY_d R^u_e (OR^v)_{4-d-e}$$

where Y is a chlorine or bromine atom, $R^u$ and $R^v$ are, independently of one another, each an alkyl group having from 1 to 12 carbon atoms, an aryl or cycloalkyl group having from 3 to 12 carbon atoms, d is from 1 to 4 and e is from 0 to 4 and d+e is from 1 to 4. This process gives polymers in good yields.

EP-A-206794 mentions, for example, $SiCl_4$, chlorosilanes such as trimethylchlorosilane or dimethylaminotrimethylsilane for the chemical modification of the hydroxyl groups on a support surface. A good polymerization activity is obtained.

EP-A-553491 discloses a catalyst for the polymerization of olefins which comprises a supported transition metal compound having a carbon-bridged biscyclopentadienyl-like ligand system and an aluminoxane. The inorganic support component used is modified with an organic or inorganic compound in order to reduce the content of hydroxyl groups on the surface. This is done using, for example, organoaluminum, organomagnesium or organosilicon compounds such as trimethylsilane or dimethyldichlorosilane. Polymers are obtained in good yields and with a good powder morphology.

DE 4406964 claims a supported catalyst system which is prepared by reacting a finely divided support with an α-trialkoxy-ω-haloalkyl compound and a metallocene having heterofunctional groups as cyclopentadienyl system and then with a quaternizing agent and, if desired, with an aluminoxane compound. These catalyst systems are suitable for the preparation of polyolefins.

It is an object of the present invention to provide a supported catalyst system having particularly high activity and an environmentally friendly and economical process for preparing polymers.

This object is achieved by a supported catalyst system comprising at least one metallocene component, at least one cocatalyst component and at least one modified inorganic oxide of silicon, aluminum or mixtures thereof, wherein the modified oxide contains organic silicon radicals containing at least one of the groups nitrogen, fluorine, phosphorus or sulfur.

According to the invention, the catalyst system is prepared by mixing at least one metallocene and at least one modified support.

The metallocene component of the catalyst system of the invention can in principle be any metallocene. Preference is given to chiral metallocene. In addition, further substituents such as halogen, alkyl, alkenyl, alkoxy, aryl or alkylaryl groups can be bonded to the central metal atom. The central metal atom is preferably an element of transition group III, IV, V or VI of the Periodic Table of the Elements, for example Ti, Zr or Hf. For the purposes of the present invention, cyclopentadienyl ligands are unsubstituted cyclopentadienyl radicals and substituted cyclopentadienyl radicals such as methylcyclopentadienyl, indenyl, 2-methylindenyl, 2-methyl-4-phenylindenyl, tetrahydroindenyl, benzoindenyl, fluorenyl, benzofluorenyl, tetrahydrofluorenyl, octahydrofluorenyl radicals. The π-ligands, e.g. cyclopentadienyl ligands, can be bridged or unbridged, with single and multiple bridges, even via ring systems, being possible. The term metallocenes also includes compounds having more than one metallocene fragment, known as multinuclear metallocenes. These can have any substitution pattern and bridging variants. The individual metallocene fragments of such multinuclear metallocenes can either be of the same type or be different from one another. Examples of such multinuclear metallocenes are described, for example, in EP-A-632063, JP-A-04/80214, JP-A-04/85310, EP-A-654476.

In addition, the term metallocene includes monocyclopentadienyl systems such as bridged cyclopentadienylamido complexes.

Preference is given to metallocenes of group IVb of the Periodic Table of the Elements, for example titanium, zirconium or hafnium, particularly preferably zirconium.

The metallocenes are preferably ones having the formula I below

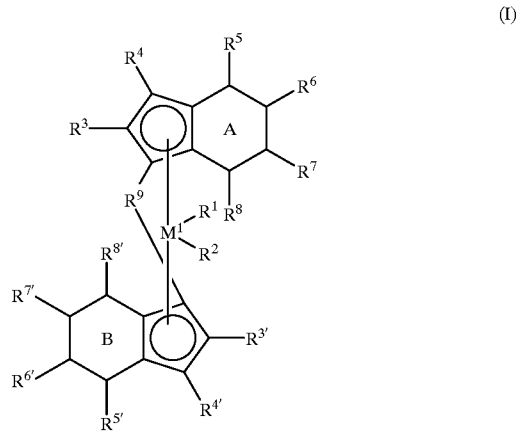

(I)

where $M^1$ is a metal of group IVb of the Periodic Table of the Elements, $R^1$ and $R^2$ are identical or different and are each a hydrogen atom, a $C_1$–$C_{10}$-alkyl group, a $C_1$–$C_{10}$-alkoxy group, a $C_6$–$C_{20}$-aryl group, a $C_6$–$C_{10}$-aryloxy group, a $C_2$–$C_{10}$-alkenyl group, an OH group, an $NR^{12}_2$ group, where $R^{12}$ is a $C_1$–$C_{10}$-alkyl group or a $C_6$–$C_{14}$-aryl group, or a halogen atom, $R^3$ to $R^8$ and $R^{3'}$ to $R^{8'}$ are identical or different and are each a hydrogen atom, a $C_1$–$C_{40}$-hydrocarbon group which may be linear, cyclic or branched, e.g. a $C_1$–$C_{10}$-alkyl group, a $C_2$–$C_{10}$-alkenyl group, a $C_6$–$C_{20}$-aryl group, a $C_7$–$C_{40}$-arylalkyl group, a $C_7$–$C_{40}$-alkylaryl group or a $C_8$–$C_{40}$-arylalkenyl group, or adjacent radicals $R^4$ to $R^8$ and/or $R^{4'}$ to $R^{8'}$ together with the atoms connecting them form a ring system, $R^9$ is a bridge, preferably

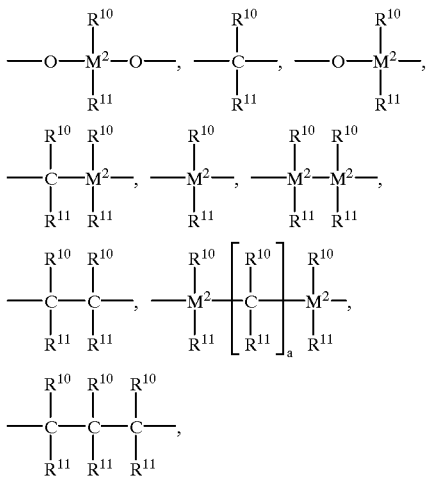

where $R^{10}$ and $R^{11}$ are identical or different and are each a hydrogen atom, a halogen atom or a $C_1$–$C_{40}$-group such as a $C_1$–$C_{20}$-alkyl group, a $C_1$–$C_{10}$ fluoroalkyl group, a $C_1$–$C_{10}$-alkoxy group, a $C_6$–$C_{14}$-aryl group, a $C_6$–$C_{10}$-fluoroaryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, or $R^{10}$ and $R^{11}$ in each case together with the atoms connecting them form one or more rings and a is an integer from zero to 18, $M^2$ is silicon, germanium or tin, and the rings A and B are identical or different, saturated or unsaturated.

$R^9$ can also link two units of the formula I with one another.

The 4,5,6,7-tetrahydroindenyl analogs corresponding to the compounds 1 are likewise of importance.

In formula I, it is preferred that $M^1$ is zirconium, $R^1$ and $R^2$ are identical and are methyl or chlorine, in particular chlorine, and $R^9=M^2R^{10}R^{11}$, where $M^2$ is silicon or germanium and $R^{10}$ and $R^{11}$ are each a $C_1$–$C_{20}$-hydrocarbon group such as $C_1$–$C_{10}$-alkyl or $C_6$–$C_{14}$-aryl, $R^5$ and $R^{5'}$ are preferably identical or different and are each a $C_6$–$C_{10}$-aryl group, a $C_7$–$C_{10}$-arylalkyl group, a $C_7$–$C_{40}$-alkylaryl group or a $C_8$–$C_{40}$-arylalkenyl group.

The indenyl or tetrahydroindenyl ligands of the metallocenes of the formula I are preferably substituted in the 2; 2,4; 4,7; 2,6; 2,4,6; 2,5,6; 2,4,5,6 or 2,4,5,6,7 positions, in particular in the 2,4 position. Preferred substituents are a $C_1$–$C_4$-alkyl group such as methyl, ethyl or isopropyl or a $C_6$–$C_{10}$-aryl group such as phenyl, naphthyl or mesityl. The 2 position is preferably substituted by a $C_1$–$C_4$-alkyl group, such as methyl, ethyl or isopropyl.

Particular preference is given to zirconocenes which have tetrahydroindenyl derivatives and indenyl derivatives as ligands.

Also of particular importance are metallocenes of the formula I in which the substituents in the 4 and 5 positions of the indenyl radicals ($R^5$ and $R^6$ or/and $R^{5'}$ and $R^{6'}$) together with the atoms connecting them form a ring system, preferably a six-membered ring. This condensed ring system can likewise be substituted by radicals as defined for $R^3$–$R^8$. An example of such compounds 1 is dimethylsilanediylbis (2-methyl-4,5-benzoindenyl)zirconium dichloride.

Very particular preference is given to those compounds of the formula I which bear a $C_6$–$C_{20}$-aryl group in the 4 position and a $C_1$–$C_4$-alkyl group in the 2 position. An example of such compounds of the formula I is dimethylsilanediylbis(2-methyl-4-phenylindenyl)zirconium dichloride.

Examples of the metallocene component of the catalyst system of the invention are:

dimethylsilanediylbis(indenyl)zirconium dichloride dimethylsilanediylbis(4-naphthylindenyl)zirconium dichloride dimethylsilanediylbis(2-methylbenzoindenyl)zirconium dichloride dimethylsilanediylbis(2-methylindenyl)zirconium dichloride dimethylsilanediylbis(2-methyl-4-(1-naphthyl)indenyl) zirconium dichloride dimethylsilanediylbis(2-methyl-4-(2-naphthyl)indenyl) zirconium dichloride dimethylsilanediylbis(2-ethyl-4-(1-naphthyl)indenyl) zirconium dichloride dimethylsilanediylbis(2-methyl-4-phenylindenyl) zirconium dichloride dimethylsilanediylbis(2-methyl-4-t-butylindenyl) zirconium dichloride dimethylsilanediylbis(2-methyl-4-isopropylindenyl) zirconium dichloride dimethylsilanediylbis(2-methyl-4-ethylindenyl) zirconium dichloride dimethylsilanediylbis(2-methyl-4-α-acenaphthylindenyl) zirconium dichloride dimethylsilanediylbis(2,4-dimethylindenyl)zirconium dichloride dimethylsilanediylbis(2-ethylindenyl)zirconium dichloride dimethylsilanediylbis(2-ethyl-4-ethylindenyl)zirconium dichloride dimethylsilanediylbis(2ethyl-4-phenylindenyl)zirconium dichloride dimethylsilanediylbis(2-isopropyl-4-(-1-naphthyl)- indenyl)zirconium dichloride dimethylsilanediylbis(2-methyl-4,5-benzoindenyl) zirconium dichloride dimethylsilanediylbis(2-methyl-4,6-diisopropylindenyl) zirconium dichloride dimethylsilanediylbis(2-methyl-4,5-diisopropylindenyl) zirconium dichloride dimethylsilanediylbis(2,4,6-trimethylindenyl)zirconium dichloride dimethylsilanediylbis(2,5,6-trimethylindenyl)zirconium dichloride dimethylsilanediylbis(2,4,7-trimethylindenyl)zirconium dichloride dimethylsilanediylbis(2-methyl-5-isobutylindenyl) zirconium dichloride dimethylsilanediylbis(2-methyl-5-tert-butylindenyl) zirconium dichloride methyl(phenyl)silanediylbis(2-methyl-4-phenylindenyl) zirconium dichloride methyl(phenyl)silanediylbis(2-methyl-4,6-diisopropylindenyl)zirconium dichloride methyl(phenyl)silanediylbis(2-methyl-4-isopropylindenyl)zirconium dichloride methyl(phenyl)silanediylbis(2-methyl-4,5-benzoindenyl) zirconium dichloride methyl(phenyl)silanediylbis(2-methyl-4,5-(methylbenzo) indenyl)zirconium dichloride methyl(phenyl)silanediylbis(2-methyl-4,5-(tetramethylbenzo)indenyl)-zirconium dichloride methyl(phenyl)silanediylbis(2-methyl-4-α-acenaphthindenyl)zirconium dichloride methyl(phenyl)silanediylbis(2-methylindenyl)zirconium dichloride methyl(phenyl)silanediylbis(2-methyl-5-isobutylindenyl) zirconium dichloride 1,2-ethanediylbis(2-methyl-4-phenylindenyl)zirconium dichloride 1,4-butanediylbis(2-methyl-4-phenylindenyl)zirconium dichloride 1,2-ethanediylbis(2-methyl-4,6-diisopropylindenyl) zirconium dichloride 1,4-butanediylbis(2-methyl-4-isopropylindenyl) zirconium dichloride 1,4-butanediylbis(2-methyl-4,5-benzoindenyl)zirconium dichloride 1,2-ethanediylbis(2-methyl-4,5-benzoindenyl)zirconium dichloride 1,2-ethanediylbis(2,4,7-trimethylindenyl)zirconium dichloride
1,2-ethanediylbis(2-methylindenyl)zirconium dichloride
1,4-butanediylbis(2-methylindenyl)zirconium dichloride
bis(butylcyclopentadienyl)Zr$^+$CH$_2$CHCHCH$_2$B$^-$(C$_6$F$_5$)$_3$
bis(methylindenyl)Zr$^+$CH$_2$CHCHCH$_2$B$^-$(C$_6$F$_5$)$_3$
dimethylsilanediylbis(2-methyl-4,5-benzoindenyl)Zr$^+$CH$_2$CHCHCH$_2$B$^-$(C$_6$F$_5$)$_3$
1,2-ethanediylbis(2-methylindenyl)Zr$^+$CH$_2$CHCHCH$_2$B$^-$(C$_6$F$_5$)$_3$
1,4-butanediylbis(2-methylindenyl)Zr$^+$CH$_2$CHCHCH$_2$B$^-$(C$_6$F$_5$)$_3$
dimethylsilanediylbis(2-methyl-4,6-diisopropylindenyl)Zr$^+$CH$_2$CHCHCH$_2$B$^-$(C$_6$F$_5$)$_3$
dimethylsilanediylbis(2-ethyl-4-phenylindenyl)Zr$^+$CH$_2$CHCHCH$_2$B$^-$(C$_6$F$_5$)$_3$
dimethylsilanediylbis(2-methyl-4-phenylindenyl)Zr$^+$CH$_2$CHCHCH$_2$B$^-$(C$_6$F$_5$)$_3$
methyl(phenyl)silanediylbis(2-methyl-4-phenylindenyl)Zr$^{+CH}_2$CHCHCH$_2$B$^-$(C$_6$F$_5$)$_3$
dimethylsilanediyibis(2-methylindenyl)Zr$^+$CH$_2$CHCHCH$_2$B$^-$(C$_6$F$_5$)$_3$
dimethylsilanediylbis(indenyl)Zr$^+$CH$_2$CHCHCH$_2$B$^-$(C$_6$F$_5$)$_3$
dimethylsilanediyl(tert-butylamido)(tetramethylcyclopentadienyl)-zirconium dichloride
[tris(pentafluorophenyl)(cyclopentadienylidene)borato](cyclopentadienyl)-1,2,3,4-tetraphenylbuta-1,3-dienylzirconium
dimethylsilanediyl-[tris(pentafluorophenyl)(2-methyl-4-phenylindenyl-idene)borato](2-methyl-4-phenylindenyl)-1,2,3,4-tetraphenylbuta-1,3-dienylzirconium
dimethylsilanediyl-[tris(trifluoromethyl)(2-methylbenzindenylidene)-borato](2-methylbenzindenyl)-1,2,3,4-tetraphenylbuta-1,3-dienylzirconium
dimethylsilanediyl-[tris(pentafluorophenyl)(2-methylindenylidene)-borato](2-methylindenyl)-1,2,3,4-tetraphenylbuta-1,3-dienylzirconium
dimethylsilanediylbis(indenyl)dimethylzirconium
dimethylsilanediylbis(4-naphthylindenyl)dimethylzirconium
dimethylsilanediylbis(2-methylbenzoindenyl)dimethylzirconium
dimethylsilanediylbis(2-methylindenyl)dimethylzirconium
dimethylsilanediylbis(2-methyl-4-(1-naphthyl)indenyl)dimethylzirconium
dimethylsilanediylbis(2-methyl-4-(2-naphthyl)indenyl)dimethylzirconium
dimethylsilanediylbis(2-methyl-4-phenylindenyl)dimethylzirconium
dimethylsilanediylbis(2-methyl-4-t-butylindenyl)dimethylzirconium
dimethylsilanediylbis(2-methyl-4-isopropylindenyl)dimethylzirconium
dimethylsilanediylbis(2-methyl-4-ethylindenyl)dimethylzirconium
dimethylsilanediylbis(2-methyl-4-α-acenaphthindenyl)dimethyizirconium
dimethylsilanediylbis(2,4-dimethylindenyl)dimethylzirconium
dimethylsilanediylbis(2-ethylindenyl)dimethylzirconium
dimethylsilanediylbis(2-ethyl-4-ethylindenyl)dimethylzirconium
dimethylsilanediylbis(2-ethyl-4-phenylindenyl)dimethylzirconium
dimethylsilanediylbis(2-methyl-4,5-benzoindenyl)dimethylzirconium
dimethylsilanediylbis(2-methyl-4,6-diisopropylindenyldimethylzirconium
dimethylsilanediylbis(2-methyl-4,5-diisopropylindenyl)dimethylzirconium
dimethylsilanediylbis(2,4,6-trimethylindenyl)dimethylzirconium
dimethylsilanediylbis(2,5,6-trimethylindenyl)dimethylzirconium
dimethylsilanediylbis(2,4,7-trimethylindenyl)dimethylzirconium
dimethylsilanediylbis(2-methyl-5-isobutylindenyl)dimethylzirconium
dimethylsilanediylbis(2-methyl-5-t-butylindenyl)dimethylzirconium
dimethylsilanediyl(tert-butylamido)(cyclopentadienyl)dimethyltitanium
dimethylsilanediyl(tert-butylamido)(indenyl)dimethylzirconium
dimethylsilanediyl(tert-butylamido)(indenyl)dimethyltitanium
dimethylsilanediyl(cyclohexylamido)(indenyl)dimethyltitanium
dimethylsilanediyl(cyclohexylamido)(cyclopentadienyl)dimethyltitanium
dimethylsilanediyl(cyclohexylamido)(methylcyclopentatienyl)dimethyl-zirconium
dimethylsilanediyl(cyclohexylamido)(methylcyclopentadienyl)dimethyl-titanium
methyl(phenyl)silanediylbis(2-methyl-4-phenylindenyl)dimethylzirconium
methyl(phenyl)silanediylbis(2-methyl-4,6-diisopropylindenyl)dimethyl-zirconium
methyl)phenyl)silanediylbis(2-methyl-4-isopropyl-indenyl)dimethyl-zirconium
methyl(phenyl)silanediylbis(2-methyl-4,5-benzoindenyl)dimethylzirconium
methyl(phenyl)silanediylbis(2-methyl-4,5-(methylbenzo)indenyl)dimethyl-zirconium
methyl(phenyl)silanediylbis(2-methyl-4,5-(tetramethylbenzo)indenyl)-dimethylzirconium
methyl(phenyl)silanediylbis(2-methyl-4-α-acenaphthindenyl)dimethyl-zirconium
methyl(phenyl)silanediylbis(2-methylindenyl)dimethylzirconium
methyl(phenyl)silanediylbis(2-methyl-5-isobutylindenyl)dimethylzirconium
1,2-ethanediylbis(2-methyl-4-phenylindenyl)dimethylzirconium
1,4-butanediylbis(2-methyl-4-phenylindenyl)dimethylzirconium
1,2-ethanediylbis(2-methyl-4,6-diisopropylindenyl)dimethylzirconium
1,4-butanediylbis(2-methyl-4-isopropylindenyl)dimethylzirconium 1,4-butanediylbis(2-methyl-4,5-benzoindenyl)
dimethylzirconium 1,2-ethanediylbis(2-methyl-4,5-benzoindenyl)
dimethylzirconium 1,2-ethanediylbis(2,4,7-trimethylindenyl)
dimethylzirconium 1,2-ethanediylbis(2-methylindenyl)dimethylzirconium 1,4-butanediylbis(2-methylindenyl)dimethylzirconium.

Particular preference is given to:

dimethylsilanediylbis(2-methylindenyl)zirconium dichloride, dimethylsilanediylbis(2-methyl-4-(1-naphthyl)indenyl) zirconium dichloride, dimethylsilanediylbis(2-methyl-4-phenylindenyl) zirconium dichloride, dimethylsilanediylbis(2-methyl-4-α-acenaphthindenyl) zirconium dichloride, dimethylsilanediylbis(2-ethyl-4-phenylindenyl) zirconium dichloride dimethylsilanediylbis(2-methyl-4,5-benzoindenyl) zirconium dichloride, dimethylsilanediylbis(2-methyl-4,6-diisopropylindenyl) zirconium dichloride.

Methods of preparing metallocenes of the formula I are described in Journal of Organometallic Chem. 288 (1985) 63–67 and the documents cited therein.

The catalyst system of the invention preferably further comprises at least one cocatalyst.

The cocatalyst component which, according to the invention, may be present in the catalyst system comprises at least one compound of the type of an aluminoxane or a Lewis acid or an ionic compound which reacts with a metallocene to convert it into a cationic compound.

The aluminoxane used is preferably a compound of the formula II $$(R'AlO)_p \tag{II}$$

Aluminoxanes can be, for example, cyclic as in formula III

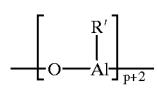
(III)

or linear as in formula IV

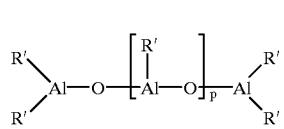
(IV)

or of the cluster type as in formula V, cf. JACS 117 (1995), 6465–74, Organometallics 13 (1994), 2957–2969.

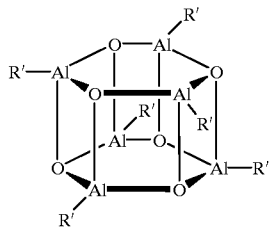
(V)

The radicals R' in the formulae (II), (III), (IV) and (V) can be identical or different and can each be a $C_1$–$C_{20}$-hydrocarbon group such as a $C_1$–$C_6$-alkyl group, a $C_6$–$C_{18}$-aryl group, benzyl or hydrogen, and p is an integer from 2 to 50, preferably from 10 to 35.

Preferably, the radicals R' are identical and are methyl, isobutyl, n-butyl, phenyl or benzyl, particularly preferably methyl.

If the radicals R' are different, they are preferably methyl and hydrogen, methyl and isobutyl or methyl and n-butyl, with hydrogen, isobutyl or n-butyl preferably being present in an amount of up to 0.01–40% (number of radicals R').

The aluminoxane can be prepared in various ways by known methods. One of the methods is, for example, reacting an aluminum-hydrocarbon compound and/or a hydridoaluminum-hydrocarbon compound with water (gaseous, solid, liquid or bound—for example as water of crystallization) in an inert solvent (e.g. toluene). To prepare an aluminoxane having different alkyl groups R', two different trialkylaluminums (AlR'$_3$+AlR"$_3$) are reacted with water in accordance with the desired composition and reactivity (cf. S. Pasynkiewicz, Polyhedron 9 (1990) 429 and EP-A-302424).

Regardless of the manner of preparation, all aluminoxane solutions have in common a varying content of unreacted aluminum starting compound which is present in free form or as adduct.

As Lewis acid, preference is given to using at least one organoboron or organoaluminum compound containing $C_1$–$C_{20}$-groups such as branched or unbranched alkyl or haloalkyl, e.g. methyl, propyl, isopropyl, isobutyl or trifluoromethyl, unsaturated groups such as aryl or haloaryl, e.g. phenyl, tolyl, benzyl, p-fluorophenyl, 3,5-difluorophenyl, pentachlorophenyl, pentafluorophenyl, 3,4,5-trifluorophenyl or 3,5-di(trifluoromethyl)phenyl.

Particular preference is given to organoboron compounds. Examples of Lewis acids are trifluoroborane, triphenylborane, tris(4-fluorophenyl)borane, tris(3,5-difluorophenyl) borane, tris(4-fluoromethylphenyl)borane, tris (pentafluorophenyl)borane, tris(tolyl)borane, tris(3,5dimethylphenyl)borane, tris (3,5-difluorophenyl)borane and/or tris(3,4,5-trifluorophenyl)borane.

Very particular preference is given to tris (pentafluorophenyl)borane.

Ionic cocatalysts used are preferably compounds which contain a non-coordinating anion such as tetrakis (pentafluorophenyl)borates, tetraphenylborates, SbF$_6^-$, CF$_3$SO$_3^-$ or ClO$_4^-$. As cationic counterion, use if made of Lewis bases such as methylamine, aniline, dimethylamine, diethylamine, N-methylanilin, diphenylamine, N,N-dimethylaniline, trimethylamine, triethylamine, tri-n- butylamine, methyldiphenylamine, pyridine, p-bromo-N,N-dimethylaniline, p-nitro-N,N-dimethylaniline, triethylphosphine, triphenyiphosphine, diphenylphosphine, tetrahydrothiophene and triphenylcarbenium.

Examples of such ionic compounds according to the invention are:

triethylammonium tetra(phenyl)borate,
tributylammonium tetra(phenyl)borate,
trimethylammonium tetra(tolyl)borate,
tributylammonium tetra(tolyl)borate,
tributylammonium tetra(pentafluorophenyl)borate,
tributylammonium tetra(pentafluorophenyl)aluminate,
tripropylammonium tetra(dimethylphenyl)borate,
tributylammonium tetra(trifluoromethylphenyl)borate,
tributylammonium tetra(4-fluorophenyl)borate,
N,N-dimethylanilinium tetra(phenyl)borate,
N,N-diethylanilinium tetra(phenyl)borate,
N,N-dimethylanilinium tetrakis(pentafluorophenyl) borate,
N,N-dimethylanilinium tetrakis(pentafluorophenyl) aluminate,
di(propyl)ammonium tetrakis(pentafluorophenyl)borate,
di(cyclohexyl)ammonium tetrakis(pentafluorophenyl) borate,
triphenylphosphonium tetrakis(phenyl)borate,
triethylphosphonium tetrakis(phenyl)borate,
diphenylphosphonium tetrakis(phenyl)borate,
tri(methylphenyl)phosphonium tetrakis(phenyl)borate,
tri(dimethylphenyl)phosphonium tetrakis(phenyl)borate,
triphenylcarbenium tetrakis(pentafluorophenyl)borate,
triphenylcarbenium tetrakis(pentafluorophenyl) aluminate,
triphenylcarbenium tetrakis(phenyl)aluminate,
ferrocenium tetrakis(pentafluorophenyl)borate and/or
ferrocenium tetrakis(pentafluorophenyl)aluminate.

Preference is given to triphenylcarbenium tetrakis (pentafluorophenyl)-borate and/or N,N-dimethylanilinium tetrakis(pentafluorophenyl)borate.

It is also possible to use mixtures of at least one Lewis acid and at least one ionic compound.

Likewise of importance as cocatalyst components are borane or carborane compounds such as 7,8-dicarbaundecaborane(13), undecahydrid-7,8-dimethyl-7,8-dicarbaundecaborane, dodecahydrido-1-phenyl-1,3-dicarbanonaborane,
tri(butyl)ammonium undecahydrido-8-ethyl-7,9-dicarbaundecaborate,
4-carbanonaborane(14),
bis(tri(butyl)ammonium) nonaborate,
bis(tri(butyl)ammonium) undecaborate,
bis(tri(butyl)ammonium) dodecaborate,
bis(tri(butyl)ammonium) decachlorodecaborate,
tri(butyi)ammonium 1-carbadecaborate,
tri(butyl)ammonium 1-carbadodecaborate,
tri(butyl)ammonium 1-trimethylsilyl-1-carbadecaborate,
tri(butyl)ammonium bis(nonahydrido-1,3-dicarbanonaborato)cobaltate(III),
tri(butyl)ammonium bis(undecahydrido-7,8-dicarbaundecaborato)-ferrate(III).

The support component of the catalyst system of the invention is a modified organic or inorganic support; preference is given to reacting at least one inorganic oxide having reactive groups such as OH groups on its surface with an N-, F-, P- and/or S-containing substance. An inorganic oxide can be, for example, $SiO_2$, $Al_2O_3$, MgO, $ZrO_2$, $TiO_2$, $B_2O_3$, CaO, ZnO, $ThO_2$, $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$. Particular preference is given to silicon oxide and/or aluminum oxide. The modified support has a specific surface area in the range from 10 to 1000 $m^2/g$, preferably from 150 to 500 $m^2/g$, particularly preferably from 200 to 400 $m^2/g$. The mean particle size of the support is from 1 to 500 $\mu$m, preferably from 5 to 350 $\mu$m, particularly preferably from 10 to 200 $\mu$m. The pore volume of the support is from 0.5 to 4.0 ml/g, preferably from 1.0 to 3.5 ml/g, very particularly preferably from 1.2 to 3 ml/g. The porous structure of the support gives a proportion of voids (pore volume) in the support particle, the support material or the shaped support body.

The shape of the pores is irregular, frequently spherical. The pores are in part connected to one another by small pore openings. The pore diameter is from about 2 to 100 nm.

The particle shape of the porous support is dependent on the modification and can be irregular or spherical. The support particle sizes can be adjusted as desired by, for example, cryogenic milling and/or sieving.

The modified support of the invention is obtained from the reaction of one or more inorganic oxides, preferably silicon oxide and/or aluminum oxide, with a preferred organosilicon compound containing N, F, P and/or S groups. This compound reacts with the reactive groups on the surface of the support, preferably with OH groups. This reduces the proportion of the OH groups which deactivate the catalytically active system on the surface of the support and thus increases the activity of the catalyst system.

The support of the invention is dried at from 100° C. to 800° C. at from 0.01 bar to 0.001 bar or at from 100° C. to 800° C. in a stream of inert gas for 5–45 hours in order to remove physisorbed water. The support material which has been dried in this way is reacted with at least one organosilicon compound of the formula VI,

 (VI)

where $R^{13}$, $R^{14}$, $R^{15}$, $R^{16}$ are, independently of one another, identical or different and are each a $C_1$–$C_{20}$-group such as a $C_1$–$C_{20}$-alkyl group, a $C_2$–$C_{20}$-alkenyl group, a $C_5$–$C_{30}$-aryl group, a $C_5$–$C_{30}$-arylalkyl group, a $C_5$–$C_{30}$-arylalkenyl group, a $C_5$–$C_{30}$-alkylaryl group, a $C_1$–$C_{20}$-alkyloxy group, a $C_1$–$C_{20}$-alkenyloxy group, a $C_5$–$C_{30}$-aryloxy group, a $C_1$–$C_{20}$-alkoxyalkyl group, a $C_5$–$C_{30}$-alkylaryloxy group, a $C_5$–$C_{30}$-arylalkyloxy group, a halogen atom, a hydroxyl group or a hydrogen atom and w, x, y, z are 0, 1, 2, 3 or 4 and w+x+y+z is 4 and at least one of the radicals $R^{13}$, $R^{14}$, $R^{15}$, $R^{16}$ is a $C_1$–$C_{20}$-amino-, phosphino-, thiol- or halogen-containing group such as a $C_1$–$C_{20}$-amino group, a $C_1$–$C_{20}$-alkylamino group, a $C_1$–$C_{20}$-alkylaminoalkyl group, a $C_5$–$C_{20}$-arylamino group, a $C_1$–$C_{20}$-phosphino group, a $C_1$–$C_{20}$-alkylphosphino group, a $C_1$–$C_{20}$-alkylphosphinoalkyl group, a $C_5$–$C_{20}$-arylphosphino group, a thiol group, a $C_5$–$C_{20}$-aryithiol group, a $C_2$–$C_{20}$-alkenylthiol group, a $C_1$–$C_{20}$-alkylthiol group, a $C_1$–$C_{20}$-alkylthioalkyl group, a $C_1$–$C_{20}$-alkylthioaryl group, a $C_5$–$C_{20}$-arylthioalkenyl group, a fluorine atom, a $C_1$–$C_{20}$-fluoroalkyl group, a $C_5$–$C_{20}$-fluoroaryl group or a $C_2$–$C_{20}$-fluoroalkenyl group, and where one of the radicals $R^{13}$ to $R^{16}$ can bridge two organosilicon units.

In formula VI, it is preferred that $R^{13}$, $R^{14}$, $R^{15}$, $R^{16}$ are, independently of one another, identical or different and are each a $C_1$–$C_{20}$-alkyl group, a $C_2$–$C_{20}$-alkenyl group, a $C_5$–$C_{30}$-arylalkyl group, a $C_5$–$C_{30}$-arylalkenyl group, a $C_1$–$C_{20}$-alkyloxy group, a halogen atom, a hydroxyl group or a hydrogen atom and w, x, y, z are 0, 1, 2, 3 or 4 and w+x+y+z is 4 and at least one of the radicals $R^{13}$, $R^{14}$, $R^{15}$, $R^{16}$ is a $C_1$–$C_{20}$-amino-, phosphino-, thiol- or halogen-containing group such as a $C_1$–$C_{20}$-alkylamino group, a $C_1$–$C_{20}$-alkylaminoalkyl group, a $C_5$–$C_{20}$-arylamino group, a $C_1$–$C_{20}$-alkylphosphino group, a $C_1$–$C_{20}$-alkylphosphinoalkyl group, a $C_5$–$C_{20}$-arylphosphino group, a $C_5$–$C_{20}$-arylthiol group, a $C_2$–$C_{20}$-alkenylthiol group, a $C_1$–$C_{20}$-alkylthiol group, a $C_1$–$C_{20}$-alkylthioalkyl group, a $C_1$–$C_{20}$-alkylthioaryl group, a $C_5$–$C_{20}$-arylthioalkenyl group, a fluorine atom, a $C_1$–$C_{20}$-fluoroalkyl group or a $C_5$–$C_{20}$-fluoroaryl group.

In formula VI, it is very particularly preferred that $R^{13}$, $R^{14}$, $R^{15}$, $R^{16}$ are, independently of one another, identical or different and are each a $C_1$–$C_{20}$-alkyl group, a $C_2$–$C_{20}$-alkenyl group, a $C_1$–$C_{20}$-alkyloxy group, a hydrogen atom or a hydrogen atom and w, x, y, z are 0, 1, 2, 3 or 4 and w+x+y+z is 4 and at least one of the radicals $R^{13}$, $R^{14}$, $R^{15}$, $R^{16}$ is a thiol-containing group such as a $C_5$–$C_{20}$-arylthiol group, a $C_2$–$C_{20}$-alkenylthiol group, a $C_1$–$C_{20}$-alkylthiol group, a $C_1$–$C_{20}$-alkylthioalkyl group, a $C_1$–$C_{20}$-alkylthioaryl group or a $C_5$–$C_{20}$-arylthioalkenyl group.

Examples of the organosilicon compound of the invention are:

3,3,3-trifluoropropyltrichlorosilane 1H, 1H, 2H, 2H-perfluorodecyltrichlorosilane 1H, 1H, 2H, 2H-perfluorooctyltrichlorosilane 2-(diphenylphophino)ethyltriethoxysilane 3-aminopropyidimethylethoxysilane 4-aminobutyidimethyoxysilane (heptafluoroisopropoxy)propylmethyldichlorosilane bis(3-(triethoxysilyl)propyl)amine bis(3-(trimethoxysilyl)propyl)ethylenediamine methylthioldimethylethoxysilane 3-propylthioltrimethoxysilane 3-propylthioltriethoxysilane 2-ethylthioltriethoxysilane 3-diethylaminopropyltrimethoxysilane N,N-dimethyl-3-aminopropyltriethoxysilane 3-(2-imidazolin-1-yl)propyltriethoxysilane N,N-dibutyl-4-aminobutyltrimethoxysilane N-hexyl-N-methyl-3-aminopropyltrimethoxysilane ethylthiolmethyldiethoxysilane 6-hexylthioltriethoxysilane 8-octylthiolmethyidimethoxysilane bis(3-propylthiol)diethoxysilane methylthiolmethyldimethoxysilane.

The support is modified by suspending the support material in a suitable solvent such as pentane, hexane, heptane, toluene or dichloromethane and slowly adding a solution of the organosilicon compound dropwise to this suspension and allowing the mixture to react for a number of hours at the boiling point of the solvent. The now modified support material is further treated at room temperature by means of filtration, washing and drying. Drying is carried out at from 20 to 140° C. and from 0.01 to 0.001 bar. The reaction temperature is preferably from −20 to +150° C., in particular from 40 to 150° C. The reaction time is from 1 to 36 hours, preferably 1–3 hours. The amount of organosilicon compound employed is preferably in the equimolar region based on the content of reactive groups on the surface of the support material. The reaction is carried out under inert conditions.

This gives a support modified according to the invention in which the proportion of reactive groups on the support surface, which could represent a poison for the metallocene components of the catalyst of the invention, has been reduced by the above-described treatment. According to the invention, the expression "modified support" describes a support which has been treated as described above. To prepare the catalyst system of the invention, the modified support component is reacted with at least one metallocene and preferably with at least one cocatalyst component. The reaction is carried out in a suitable solvent such as pentane, heptane, toluene, dichloromethane or dichlorobenzene in which the passivated support component is suspended and is mixed with a solution of the metallocene and cocatalyst components or, preferably, the reaction is carried out such that a total amount of solution of the metallocene and cocatalyst components corresponding to from 110 to 370% of the pore volume of the support component is added. The preparation of the catalyst system of the invention is carried out at from −20 to 150° C., preferably at from 20 to 50° C., and a contact time between 15 minutes and 25 hours, preferably between 15 minutes and 15 hours.

The catalyst system of the invention obtained has a metallocene content, preferably a zirconium content of from 0.001 to 2 mmol of $Zr/g_{support}$, preferably from 0.01 to 0.5 mmol of $Zr/g_{support}$, particularly preferably from 0.01 to 0.1 mmol of $Zr/g_{support}$. If at least one aluminoxane is used as cocatalyst component, the aluminum/zirconium ratio is between 50:1 and 1000:1 (Al:Zr), preferably from 100:1 to 700:1 (Al:Zr). If boron compounds are used as cocatalyst component, the boron/zirconium ratio is in the range from 1:1 to 50:1 (B:Zr), preferably from 1:1 to 10:1 (B:Zr).

The catalyst system of the invention gives polymers such as polypropylene having a high stereospecificity and regiospecificity with an extraordinarily high activity.

The present invention also provides a process for preparing a polyolefin by polymerization of one or more olefins in the presence of the catalyst system of the invention comprising at least one modified support. The term polymerization refers to both homopolymerization and copolymerization.

Preference is given to polymerizing olefins of the formula $R^{17}$—CH=CH—$R^{18}$ where $R^{17}$ and $R^{18}$ are identical or different and are each a hydrogen atom or a carbon-containing radical having from 1 to 20 carbon atoms, in particular from 1 to 10 carbon atoms, and $R^{17}$ and $R^{18}$ together with the atoms connecting them can form one or more rings. Examples of such olefins are 1-olefins having from 2 to 40, preferably from 2 to 10, carbon atoms, for example ethylene, propene, 1-butene, 1-pentene, 1-hexene, 4-methyl-1-pentene or 1-octene, styrene, dienes such as 1,3-butadiene, 1,4-hexadiene, vinylnorbornene or norbornadiene and cyclic olefins such as norbornene, tetracyclododecene or methylnorbornene. In the process of the invention, preference is given to homopolymerizing ethene or propene, or copolymerizing ethene with one or more 1-olefines having from 3 to 20 carbon atoms, e.g. propene, and/or one or more dienes having from 4 to 20 carbon atoms, e.g. 1,4-butadiene or norbomadiene. Examples of such copolymers are ethene/propene copolymers and ethene/propene/1,4-hexadiene copolymers.

The polymerization is preferably carried out at a temperature of from −60 to 250° C., particularly preferably from 50 to 200° C. The pressure is preferably from 0.5 to 2000 bar, particularly preferably from 5 to 64 bar.

The polymerization time is from 10 minutes to 10 hours, preferably from 30 minutes to 120 minutes.

The polymerization can be carried out in solution, in bulk, in suspension or in the gas phase, continuously or batchwise, in one or more stages.

The catalyst system used in the process of the present invention preferably comprises one transition metal compound of the metallocene component. It is also possible to use mixtures of two or more transition metal compounds of the metallocene component, for example for preparing polyolefins having a broad or multimodal molecular weight distribution and reactor blends.

A prepolymerization can be carried out with the aid of the catalyst system of the invention. For the prepolymerization, preference is given to using the (or one of the) olefin(s) used in the polymerization.

The supported catalyst system can be resuspended as powder or while still moist with solvent in an inert suspension medium. The suspension can be introduced into the polymerization system.

Before introducing the supported catalyst system of the invention into the polymerization system, it is advantageous to purify the olefin using an aluminum alkyl compound such as trimethylaluminum, triethylaluminum, triisobutylaluminum, trioctylaluminum, isoprenylaluminum or aluminoxanes or alkyl and aryl compounds of boron to make the polymerization system inert (for example to remove catalyst poisons present in the olefin). This purification can be carried out either in the polymerization itself or the olefin is brought into contact with the Al compound and subsequently separated off again before being introduced into the polymerization system. If this purification is carried out in the polymerization system itself, the aluminum alkyl compound is added to the polymerization system in a concentration of from 0.01 to 100 mmol of Al per kg of reactor content. Preference is given to using triisobutylaluminum and triethylaluminum in a concentration of from 0.1 to 10 mmol of Al per kg of reactor content.

As molecular weight regulator and/or to increase the activity, hydrogen is added if required. The total pressure in the polymerization system is from 0.5 to 2500 bar, preferably from 2 to 1500 bar.

The catalyst system is employed in a concentration, based on the transition metal, of preferably from $10^{-3}$ to $10^{-8}$ mol, particularly preferably from $10^{-4}$ to $10^{-7}$ mol, of transition metal per $dm^3$ of solvent or per $dm^3$ of reactor volume.

If the polymerization is carried out as a suspension or solution polymerization, an inert solvent customary for the Ziegler low-pressure process is used. The polymerization is carried out, for example, in an aliphatic or cycloaliphatic hydrocarbon; examples of such hydrocarbons are propane, butane, hexane, heptane, isooctane, cyclohexane and methylcyclohexane. A petroleum fraction or hydrogenated diesel oil fraction can also be used. It is also possible to use toluene. Preference is given to carrying out the polymerization in the liquid monomer.

If inert solvents are used, the monomers are metered in in gaseous or liquid form.

The polymerization time can be any desired, since the catalyst system to be used according to the invention displays only a slight time-dependent drop in the polymerization activity.

The polymers prepared by the process of the invention are suitable, in particular, for producing shaped articles such as films, sheets or large hollow bodies, e.g. pipes.

The catalyst system of the invention achieves a catalyst activity of from 100 to 350 kg of PP/g of metallocene xh at a cocatalyst: metallocene ratio of <400:1. The polymers of the invention have melting points of from 143 to 165° C. The invention is illustrated by the examples below.

EXAMPLES

General Procedure

The preparation and handling of the organometallic compounds are carried out with exclusion of air and moisture under argon (Schlenk technique). All solvents required were made absolute before use by boiling for a number of hours over a suitable dessicant and subsequent distillation under argon. As spherical, porous support materials, use was made of silicas such as MS grades from PQ Corporation, ES or EP grades from Crosfield, or silica grades 948, 952, 955 from Grace Davisson or the like. The compounds were characterized using $^1$H-NMR, $^{13}$C-NMR and IR spectroscopy.

Example 1

Modification of the Support Material 50 g of $SiO_2$ (MS 3030, from PQ, dried at 140° C. and 10 mbar) were suspended in 260 ml of toluene and, while stirring, 25 g of mercapto-propyl(trimethoxy)silane were slowly added dropwise. This mixture was stirred for 20 hours under reflux and this suspension was then filtered. The solid was washed three times with 200 ml each time of methanol and dried to constant weight in an oil pump vacuum.

Preparation of the Supported Catalyst System

A solution of 10 mg (0.016 mmol) of dimethylsilanediylbis(2-methyl-4-phenylinde-nyl)zirconium dichloride together with 1 $cm^3$ of 30% strength (4.81 mmol) methylaluminoxane solution in toluene is mixed with 1 g of the modified support material resuspended in 5 ml of toluene. The suspension was stirred for 1 hour at room temperature and the solvent was then removed in an oil pump vacuum until the weight was constant. For introduction into the polymerization system, the solid was resuspended in toluene.

Polymerization

In parallel thereto, a dry 16 $dm^3$ reactor was flushed first with nitrogen and subsequently with propylene and charged with 10 $dm^3$ of liquid propylene. 3 $cm^3$ of triisobutylaluminum (pure, 12 mmol) diluted with 30 $cm^3$ of hexane where then introduced into the reactor and the mixture was stirred at 30° C. for 15 minutes. The catalyst suspension was subsequently introduced into the reactor. The reaction mixture was heated to the polymerization temperature of 60° C. (4° C./min) and the polymerization system was held at 60° C. for 1 hour by cooling. The polymerization was stopped by venting the remaining propylene. The polymer was dried in a vacuum drying oven, giving 3.3 kg of polypropylene powder. The reactor had no deposits on the internal wall or stirrer. The catalyst activity was 330 kg of PP/g of metallocene xh.

Example 2

Modification of the Support Material 10 g of $SiO_2$ (MS 3030, from PQ, dried at 140° C. and 10 mbar) were suspended in 60 ml of toluene and, while stirring, 3.8 g of mercapto-methyl(diethoxy)methylsilane were slowly added dropwise. This mixture was stirred for 20 hours under reflux and the suspension was then filtered. The solid was washed three times with 20 ml each time of methanol and dried to constant weight in an oil pump vacuum.

Preparation of the Supported Catalyst System

A solution of 10 mg (0.016 mmol) of dimethylsilanediylbis(2-methyl-4-phenylinde-nyl) zirconium dichloride together with 1 cm$^3$ of 30% strength (4.81 mmol) methylaluminoxane solution in toluene is mixed with 1 g of the modified support material resuspended in 5 ml of toluene. The suspension was stirred for 1 hour at room temperature and the solvent was then removed in an oil pump vacuum until the weight was constant. For introduction into the polymerization system, the solid was resuspended in toluene.

Polymerization

In parallel thereto, a dry 16 dm$^3$ reactor was flushed first with nitrogen and subsequently with propylene and charged with 10 dm$^3$ of liquid propylene. 3 cm$^3$ of triisobutylaluminum (pure, 12 mmol) diluted with 30 cm$^3$ of hexane were then introduced into the reactor and the mixture was stirred at 30° C. for 15 minutes. The catalyst suspension was subsequently introduced into the reactor. The reaction mixture was heated to the polymerization temperature of 60° C. (4° C./min) and the polymerization system was held at 60° C. for 1 hour by cooling. The polymerization was stopped by venting the remaining propylene. The polymer was dried in a vacuum drying oven, giving 2.9 kg of polypropylene powder. The reactor had no deposits on the internal wall or stirrer. The catalyst activity was 290 kg of PP/g of metallocene xh.

Example 3

Modification of the Support Material 10 g of SiO$_2$ (MS 3030, from PQ, dried at 140° C. and 10 mbar) were suspended in 60 ml of toluene and, while stirring, 4.8 g of mercapto-propylmethyl(dimethoxy)silane were slowly added dropwise. This mixture was stirred for 20 hours under reflux and the suspension was then filtered. The solid was washed three times with 20 ml each time of methanol and dried to constant weight in an oil pump vacuum.

Preparation of the Supported Catalyst System

A solution of 10 mg (0.016 mmol) of dimethylsilanediylbis(2-methyl-4-phenylinde-nyl) zirconium dichloride together with 1 cm$^3$ of 30% strength (4.81 mmol) methylaluminoxane solution in toluene is mixed with 1 g of the modified support material resuspended in 5 ml of toluene. The suspension was stirred for 1 hour at room temperature and the solvent was then removed in an oil pump vacuum until the weight was constant. For introduction into the polymerization system, the solid was resuspended in toluene.

Polymerization

In parallel thereto, a dry 16 dm$^3$ reactor was flushed first with nitrogen and subsequently with propylene and charged with 10 dm$^3$ of liquid propylene. 3 cm$^3$ of triisobutylaluminum (pure, 12 mmol) diluted with 30 cm$^3$ of hexane were then introduced into the reactor and the mixture was stirred at 30° C. for 15 minutes. The catalyst suspension was subsequently introduced into the reactor. The reaction mixture was heated to the polymerization temperature of 60° C. (4° C./min) and the polymerization system was held at 60° C. for 1 hour by cooling. The polymerization was stopped by venting the remaining propylene. The polymer was dried in a vacuum drying oven, giving 3.1 kg of polypropylene powder. The reactor had no deposits on the internal wall or stirrer. The catalyst activity was 310 kg of PP/g of metallocene xh.

Example 4

Modification of the Support Material 10 g of SiO$_2$ (MS 3030, from PQ, dried at 140° C. and 10 mbar) were suspended in 60 ml of toluene and, while stirring, 3.6 g of (mercapto-propyl)(methyl)(dimethoxy) silane were slowly added dropwise. This mixture was stirred for 15 hours under reflux and the suspension was then filtered. The solid was washed three times with 100 ml each time of methanol and dried to constant weight in an oil pump vacuum.

Preparation of the Supported Catalyst System 15 mg (0.032 mmol) of dimethylsilanediylbis(2-methylindenyl)zirconium dichloride were mixed with 2 cm$^3$ of 30% strength (9.62 mmol) methylaluminoxane solution in toluene and stirred for 5 hours. 2 g of the modified support material and a further 5 ml of tolune were then added thereto. The suspension was stirred for 1 hour at room temperature and the solvent was then removed in an oil pump vacuum until the weight was constant. For introduction into the polymerization system, the solid was resuspended in toluene.

Polymerization

In parallel thereto, a dry 16 dm$^3$ reactor was flushed first with nitrogen and subsequently with propylene and charged with 10 dm$^3$ of liquid propylene. 3 cm$^3$ of triisobutylaluminum (pure, 12 mmol) diluted with 30 cm$^3$ of hexane were then introduced into the reactor and the mixture was stirred at 30° C. for 15 minutes. The catalyst suspension was subsequently introduced into the reactor. The reaction mixture was heated to the polymerization temperature of 60° C. (4° C./min) and the polymerization system was held at 60° C. for 1 hour by cooling. The polymerization was stopped by venting the remaining propylene. The polymer was dried in a vacuum drying oven, giving 1.7 kg of polypropylene powder. The reactor had no deposits on the internal wall or stirrer. The catalyst activity was 113 kg of PP/g of metallocene xh.

Example 5

Modification of the Support Material 10 g of SiO$_2$ (MS 3030, from PQ, dried at 140° C. and 10 mbar) were suspended in 100 ml of toluene and, while stirring, 4 g of methoxypropyl(trimethoxy)silane were slowly added dropwise. This mixture was stirred for 15 hours under reflux and the suspension was then filtered. The solid was washed three times with 100 ml each time of methanol and dried to constant weight in an oil pump vacuum.

Preparation of the Supported Catalyst System 15 mg (0.032 mmol) of dimethylsilanediylbis(2-methylindenyl)zirconium dichloride were mixed with 2 cm$^3$ of 30% strength (9.62 mmol) methylaluminoxane solution in toluene and stirred for 5 hours. 2 g of the modified support material and a further 5 ml of tolune were then added thereto. The suspension was stirred for 1 hour at room temperature and the solvent was then removed in an oil pump vacuum until the weight was constant. For introduction into the polymerization system, the solid was resuspended in toluene.

Polymerization

In parallel thereto, a dry 16 dm$^3$ reactor was flushed first with nitrogen and subsequently with propylene and charged with 10 dm$^3$ of liquid propylene. 3 cm$^3$ of triisobutylaluminum (pure, 12 mmol) diluted with 30 cm$^3$ of hexane were then introduced into the reactor and the mixture was stirred at 30° C. for 15 minutes. The catalyst suspension was subsequently introduced into the reactor. The reaction mixture was heated to the polymerization temperature of 60° C. (4° C./min) and the polymerization system was held at 60° C. for 1 hour by cooling. The polymerization was stopped by venting the remaining propylene. The polymer was dried in a vacuum drying oven, giving 1.5 kg of polypropylene powder. The reactor had no deposits on the internal wall or stirrer. The catalyst activity was 100 kg of PP/g of metallocene xh.

Example 6

Modification of the Support Material 10 g of SiO$_2$ (MS 3030, from PQ, dried at 140° C. and 10 mbar) were suspended in 100 ml of toluene and, while stirring, 4 g of methoxypropyl(trimethoxy)silane were slowly added dropwise. This mixture was stirred for 15 hours under reflux and the suspension was then filtered. The solid was washed three times with 100 ml each time of methanol and dried to constant weight in an oil pump vacuum.

Preparation of the Supported Catalyst System 10 mg (0.016 mmol) of dimethylsilanediylbis(2-methyl-4-phenylindenyl)zirconium dichloride were mixed with 1 cm$^3$ of 30% strength (4.81 mmol) methylaluminoxane solution in toluene and stirred for 5 hours. 1 g of the modified support material and a further 5 ml of tolune were then added thereto. The suspension was stirred for 1 hour at room temperature and the solvent was then removed in an oil pump vacuum until the weight was constant. For introduction into the polymerization system, the solid was resuspended in toluene.

Polymerization

In parallel thereto, a dry 16 dm$^3$ reactor was flushed first with nitrogen and subsequently with propylene and charged with 10 dm$^3$ of liquid propylene. 3 cm$^3$ of triisobutylaluminum (pure, 12 mmol) diluted with 30 cm$^3$ of hexane were then introduced into the reactor and the mixture was stirred at 30° C. for 15 minutes. The catalyst suspension was subsequently introduced into the reactor. The reaction mixture was heated to the polymerization temperature of 60° C. (4° C./min) and the polymerization system was held at 60° C. for 1 hour by cooling. The polymerization was stopped by venting the remaining propylene. The polymer was dried in a vacuum drying oven, giving 2.7 kg of polypropylene powder. The reactor had no deposits on the internal wall or stirrer. The catalyst activity was 270 kg of PP/g of metallocene xh.

Comparative Example 1

Modification of the Support Material 8.28 g of SiO$_2$ were mixed with a solution of 2.96 g (12 mmol) of chloromethylphenyltrimethoxysilane in 40 ml of toluene and the mixture was heated for 2 hours at 115° C. 10 ml of volatile constituents were then removed in an oil pump vacuum and the remaining suspension was heated at 115° C. for 1 hour. After cooling, the suspension was filtered, the solid was washed four times with diethyl ether and dried for 12 hours in a high vacuum. This gave 8.7 g of the functionalized support.

2.55 g of this functionalized support were admixed at 70° C. with 15 ml of trimethylchlorosilane under argon. The solid was filtered off and washed twice with 20 ml each time of tolene and twice with 20 ml each time of diethyl ether. The functionalized support was then dried for 12 hours in a high vacuum.

Preparation of the Supported Catalyst System 10 mg (0.016 mmol) of dimethylsilanediylbis(2-methyl-4-phenyl-indenyl)zirconium dichloride were mixed with 1 cm$^3$ of 30% strength (4.81 mmol) methylaluminoxane solution in toluene and stirred for 5 hours. 1 g of the functionalized support was then added thereto and the mixture was stirred for 1 hour. Remaining solvent was then removed in an oil pump vacuum until the weight was constant. For introduction into the polymerization system, the solid was resuspended in toluene.

Polymerization

In parallel thereto, a dry 16 dm$^3$ reactor was flushed first with nitrogen and subsequently with propylene and charged with 10 dm$^3$ of liquid propylene. 3 cm$^3$ of triisobutylaluminum (pure, 12 mmol) diluted with 30 cm$^3$ of hexane were then introduced into the reactor and the mixture was stirred at 30° C. for 15 minutes. The catalyst suspension was subsequently introduced into the reactor. The reaction mixture was heated to the polymerization temperature of 65° C. (4° C./min) and the polymerization system was held at 65° C. for 1 hour by cooling. The polymerization was stopped by venting the remaining propylene. This gave 7 g of polypropylene powder. The catalyst activity was 0.7 kg of PP/g of metallocene xh.

Comparative Example 2

Modification of the Support Material 10 g of SiO$_2$ were mixed with a solution of 5 g (20 mmol) of chloromethylphenyl-trimethoxysilane in 60 ml of toluene and the mixture was heated under reflux for 20 hours. The suspension was filtered and the solid was washed three times with 20 ml each time of methanol and remaining solvent was removed in an oil pump vacuum.

Preparation of the Supported Catalyst System

The solution of 10 mg (0.016 mmol) of dimethylsilanediylbis(2-methyl-4-phenylinde-nyl) zirconium dichloride and 1 cm$^3$ of 30% strength (4.81 mmol) methylaluminoxane solution in toluene was mixed with 1 g of the modified support material resuspended in 5 ml of toluene. The suspension was stirred for 1 hour at room temperature and the solvent was then removed in an oil pump vacuum until the weight was constant. For introduction into the polymerization system, the solid was resuspended in toluene.

Polymerization

In parallel thereto, a dry 16 dm³ reactor was flushed first with nitrogen and subsequently with propylene and charged with 10 dm³ of liquid propylene. 3 cm³ of triisobutylaluminum (pure, 12 mmol) diluted with 30 cm³ of hexane were then introduced into the reactor and the mixture was stirred at 30° C. for 15 minutes. The catalyst suspension was subsequently introduced into the reactor. The reaction mixture was heated to the polymerization temperature of 65° C. (4° C./min) and the polymerization system was held at 65° C. for 1 hour by cooling. The polymerization was stopped by venting the remaining propylene. No polypropylene could be obtained.

I claim:

1. A supported catalyst composition consisting essentially of a combination of components consisting essentially of at least one metallocene catalyst component and at least one cocatalyst component, said combination being supported by a support which is at least one modified inorganic oxide which has been chemically modified by linkages with organic silicon radicals containing at least one of the elements nitrogen, fluorine, phosphorus or sulfur, and wherein said at least one metallocene catalyst component consists essentially of a metallocene compound having the formula (I):

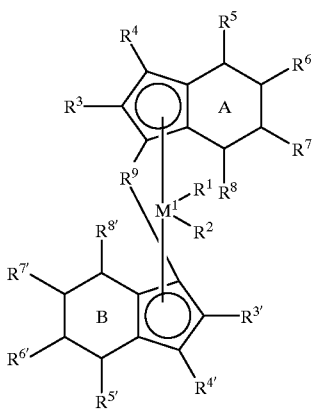

(I)

where

M¹ is a metal of group IVb of the Periodic Table of the Elements,

R¹ and R² are identical or different and are each a hydrogen atom, a $C_1$–$C_{10}$-alkyl group, a $C_1$–$C_{10}$-alkoxy group, a $C_6$–$C_{20}$-aryl group, a $C_6$–$C_{10}$-aryloxy group, a $C_2$–$C_{10}$-alkenyl group, an OH group, a $NR^{12}{}_2$ group, where $R^{12}$ is a $C_1$–$C_{10}$-alkyl group or a $C_6$–$C_{14}$-aryl group, or a halogen atom, R³ to R⁸ and R³' to R⁸' are identical or different and are each a hydrogen atom, a $C_1$–$C_{40}$-hydrocarbon group which may be linear, cyclic or branched, or adjacent radicals R⁴ to R⁸ and/or R⁴' to R⁸' together with the atoms connecting them form a ring system, and R⁹ is a bridge which optionally links together two units of the metallocene having the formula (I):

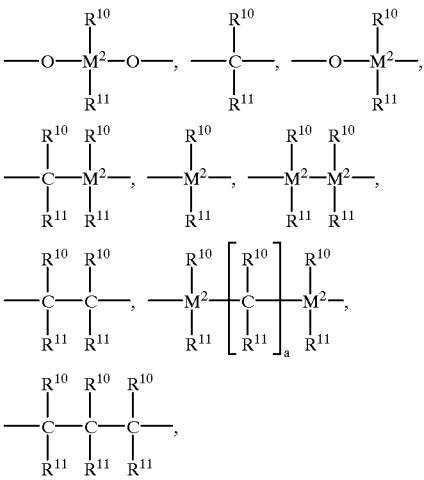

where $R^{10}$ and $R^{11}$ are identical or different and are each a hydrogen atom, a halogen atom or a $C_1$–$C_{40}$-group, or $R^{10}$ and $R^{11}$ in each case together with the atoms connecting them form one or more rings, a is an integer from zero to 18, M² is silicon, germanium or tin, and the rings A and B are identical or different and are each saturated or unsaturated.

2. The supported catalyst composition as claimed in claim 1, wherein said at least one cocatalyst component is an aluminoxane, a Lewis acid or an ionic compound, and wherein said at least one cocatalyst component has been reacted with said at least one metallocene catalyst component to convert it into a cationic compound.

3. A supported catalyst composition comprising a combination of components comprising at least one metallocene catalyst component and at least one cocatalyst component, said combination being supported by a support which is at least one modified inorganic oxide which has been chemically modified by linkages with organic silicon radicals containing at least one of the elements nitrogen, fluorine, phosphorus or sulfur and said organic silicon radicals comprise at least one thiol-containing group which is a thiol group, a $C_5$–$C_{20}$-arylthiol group, a $C_2$–$C_{20}$-alkenylthiol group, a $C_1$–$C_{20}$-alkylthiol group, a $C_1$–$C_{20}$-alkylthioalkyl group, a $C_1$–$C_{20}$-alkylthioaryl group or a $C_5$–$C_{20}$-arylthioalkenyl group.

4. The supported catalyst composition as claimed in claim 3, wherein said at least one cocatalyst component is at least one aluminoxane compound, at least one Lewis acid, at least one ionic compound, or a mixture of said at least one Lewis acid and said at least one ionic compound, and wherein said at least one cocatalyst component has been reacted with said at least one metallocene catalyst component to convert it into a cationic compound.

5. The supported catalyst composition as claimed in claim 3, wherein said support comprises an organoaluminum compound.

6. A process for preparing the supported catalyst composition as claimed in claim 3, said process comprising the steps of:

(a) mixing said at least one modified inorganic oxide and said at least one metallocene catalyst component, in a solvent, and (b) drying the resulting supported catalyst composition.

7. The process as claimed in claim 6, wherein said at least one modified inorganic oxide has been obtained by:
(a) suspending said at least one inorganic oxide in said solvent, which solvent is an organic liquid, to form a suspension,
(b) adding an organosilicon compound to said suspension to form a solid reaction product, and
(c) isolating said solid reaction product.

8. The process as claimed in claims 6, wherein the supported catalyst composition is dried and obtained as a powder.

9. A process for preparing a polyolefin, comprising polymerizing at least one olefin in the presence of the supported catalyst composition as claimed in claim 3.

10. The polyolefin prepared by the process as claimed in claim 9.

11. A process for preparing the supported catalyst composition as claimed in claim 3, comprising:
(a) suspending in a first solvent at least one inorganic oxide having surface OH groups, thereby obtaining a suspension containing said at least one inorganic oxide,
(b) adding to said suspension said organosilicon compound, which has the formula (VI):

$$SiR^{13}{}_w R^{14}{}_x R^{15}{}_y R^{16}{}_z \qquad (VI)$$

where
$R^{13}$, $R^{14}$, $R^{15}$, $R^{16}$ are, independently of one another, identical or different and are each a $C_1$–$C_{20}$-alkyl group, a $C_2$–$C_{20}$-alkenyl group, a $C_5$–$C_{30}$-aryl group, a $C_5$–$C_{30}$-arylalkyl group, a $C_5$–$C_{30}$-arylalkenyl group, a $C_5$–$C_{30}$-alkylaryl group, a $C_1$–$C_{20}$-alkoxy group, a $C_1$–$C_{20}$-alkenyloxy group, a $C_5$–$C_{30}$-aryloxy group, a $C_1$–$C_{20}$-alkoxyalkyl group, a $C_5$–$C_{30}$-alkylaryloxy group, a $C_5$–$C_{30}$-arylalkyloxy group, a fluorine atom, a hydroxyl group or a hydrogen atom, w, x, y, z are 0, 1, 2, 3 or 4,
w+x+y+z is 4,
at least one of the radicals $R^{13}$, $R^{14}$, $R^{15}$, $R^{16}$ is a $C_1$–$C_{20}$-amino-, phosphino-, thiol- or fluorine-containing group, and
optionally, one of the radicals $R^{13}$ to $R^{16}$ bridges two organosilicon units, wherein said organosilicon compound is reactive with said surface hydroxyl groups to form a reaction mixture, (c) permitting said reaction mixture containing said first solvent, said at least one inorganic oxide, and said organosilicon compound to react at from 40 to 150° C. for from 1 to 36 hours to form a resulting mixture comprising said at least one modified inorganic oxide,
(d) drying said resulting mixture to obtain said support,
(e) reacting said support, in a second solvent, with said at least one metallocene catalyst component and said at least one co-catalyst component to form a product mixture,
(f) drying said product mixture to obtain the supported catalyst composition as claimed in claim 3 in the form of a powder essentially dried or a powder moistened with said second solvent.

12. A process for preparing an olefin polymer comprising the step of polymerizing an olefin in the presence of the supported catalyst composition prepared by the process of claim 11.

13. The supported catalyst composition as claimed in claim 3, wherein said at least one metallocene catalyst component is a chiral compound.

14. The supported catalyst composition as claimed in claim 3, wherein said at one least modified inorganic oxide contains identical or different groups having the formula:

where
$R_n$ are identical or different and are each a $C_1$–$C_{20}$-alkyl group, a $C_2$–$C_{20}$-alkenyl group, a $C_5$–$C_{30}$-aryl group, a $C_5$–$C_{30}$-arylalkyl group, a $C_5$–$C_{30}$-arylalkenyl group, a $C_5$–$C_{30}$-alkylaryl group, a $C_1$–$C_{20}$-alkoxy group, a $C_1$–$C_{20}$-alkenyloxy group, a $C_5$–$C_{30}$-aryloxy group, a $C_1$–$C_{20}$-alkoxyalkyl group, a $C_5$–$C_{30}$-alkylaryloxy group, or a $C_5$–$C_{30}$-arylalkyl group,
at least one of the $R_n$ radicals is a $C_1$–$C_{20}$-amino-, phosphino-, thio- or fluorine- containing group, and
n is an integer from 1 to 3.

15. The supported catalyst composition as claimed in claim 14, wherein said $C_1$–$C_{20}$-amino-, phosphino-, thio- or fluorine- containing group is a $C_1$–$C_{20}$-amino group, a $C_1$–$C_{20}$-alkylamino group, a $C_1$–$C_{20}$-alkylaminoalkyl group, a $C_5$–$C_{20}$-arylamino group, a $C_1$–$C_{20}$-phosphino group, a $C_1$–$C_{20}$-alkylphosphino group, a $C_1$–$C_{20}$-alkylphosphinoalkyl group, a $C_5$–$C_{20}$-arylphosphino group, a thiol group, a $C_5$–$C_{20}$-arylthiol group, a $C_2$–$C_{20}$-alkenylthiol group, a $C_1$–$C_{20}$-alkylthiol group, a $C_1$–$C_{20}$-alkylthioalkyl group, a $C_1$–$C_{20}$-alkylthioaryl group, a $C_5$–$C_{20}$-arylthioalkenyl group, a $C_1$–$C_{20}$-fluoroalkyl group, a $C_5$–$C_{20}$-fluoroaryl group or a $C_2$–$C_{20}$-fluoroalkenyl group.

16. The supported catalyst system as claimed in claim 3, wherein said at least one metallocene catalyst component comprises a metallocene compound having the formula (I):

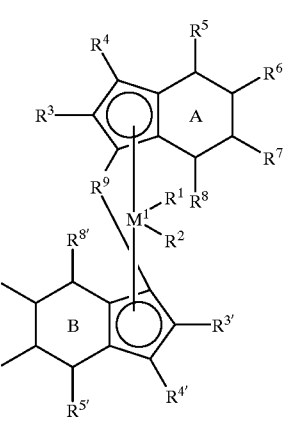

where
$M^1$ is a metal of group IVb of the Periodic Table of the Elements,
$R^1$ and $R^2$ are identical or different and are each a hydrogen atom, a $C_1$–$C_{10}$-alkyl group, a $C_1$–$C_{10}$-alkoxy group, a $C_6$–$C_{20}$-aryl group, a $C_6$–$C_{10}$-aryloxy group, a $C_2$–$C_{10}$-alkenyl group, an OH group, a $NR^{12}{}_2$ group, where $R^{12}$ is a $C_1$–$C_{10}$-alkyl group or a $C_6$–$C_{14}$-aryl group, or a halogen atom,
$R^3$ to $R^8$ and $R^{3'}$ to $R^{8'}$ are identical or different and are each a hydrogen atom, a $C_1$–$C_{40}$-hydrocarbon group which may be linear, cyclic or branched, or
adjacent radicals $R^4$ to $R^8$ and/or $R^{4'}$ to $R^{8'}$ together with the atoms connecting them form a ring system, and
$R^9$ is a bridge which optionally links together two units of the metallocene having the formula (I):

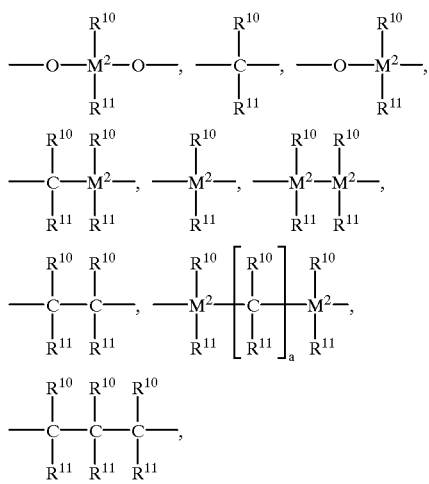

where

R$^{10}$ and R$^{11}$ are identical or different and are each a hydrogen atom, a halogen atom or a C$_1$–C$_{40}$-group, or R$^{10}$ and R$^{11}$ in each case together with the atoms connecting them form one or more rings, a is an integer from zero to 18, M$^2$ is silicon, germanium or tin, and the rings A and B are identical or different and are each saturated or unsaturated.

17. A supported catalyst composition comprising a combination of components comprising at least one metallocene catalyst component and at least one cocatalyst component, said combination being supported by a support which is at least one modified inorganic oxide which has been chemically modified by linkages with organic silicon radicals containing at least one of the elements nitrogen, fluorine, phosphorus or sulfur, and wherein said at least one metallocene catalyst component comprises a metallocene compound having the formula (I):

(I)

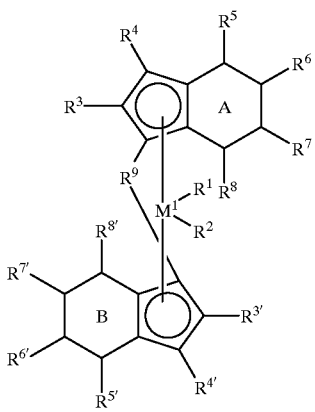

where

M$^1$ is a metal of group IVb of the Periodic Table of the Elements,

R$^1$ and R$^2$ are identical or different and are each a hydrogen atom, a C$_1$–C$_{10}$-alkyl group, a C$_1$–C$_{10}$-alkoxy group, a C$_6$–C$_{20}$-aryl group, a C$_6$–C$_{10}$-aryloxy group, a C$_2$–C$_{10}$-alkenyl group, an OH group, a NR$^{12}_2$ group, where R$^{12}$ is a C$_1$–C$_{10}$-alkyl group or a C$_6$–C$_{14}$-aryl group, or a halogen atom, R$^3$ to R$^8$ and R$^{3'}$ to R$^{8'}$ are identical or different and are each a hydrogen atom, a C$_1$–C$_{40}$-hydrocarbon group which may be linear, cyclic or branched, or adjacent radicals R$^4$ to R$^8$ and/or R$^{4'}$ to R$^{8'}$ together with the atoms connecting them form a ring system, and R$^9$ is a bridge which optionally links together two units of the metallocene having the formula (I):

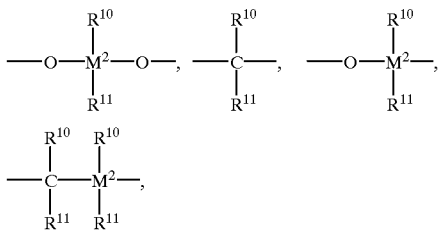

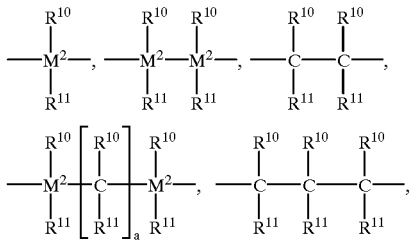

where

R$^{10}$ and R$^{11}$ are identical or different and are each a hydrogen atom, a halogen atom or a C$_1$–C$_{40}$-group, or R$^{10}$ and R$^{11}$ in each case together with the atoms connecting them form one or more rings, a is an integer from zero to 18, M$^2$ is silicon, germanium or tin, and the rings A and B are identical or different and are each saturated or unsaturated.

* * * * *